UNITED STATES PATENT OFFICE.

WILLIAM A. FRENCH, OF PHILADELPHIA, PENNSYLVANIA.

IMPROVED COMPOUND FOR COATING THE SURFACES OF STEAM-BOILERS, &c.

Specification forming part of Letters Patent No. 94,883, dated September 14, 1869.

CASE B.

*To all whom it may concern:*

Be it known that I, WILLIAM A. FRENCH, of the city and county of Philadelphia and State of Pennsylvania, have invented a new and Improved Compound for Coating the Surfaces of Steam-Boilers, Steam-Pipes, Steam-Drums, Hot and Cold Water Pipes, and other objects; and I do hereby declare that the following is a full, clear, and exact description of the same.

This invention relates to an improvement on the coating compound described in the specification of my application for Letters Patent marked "Case A," and bearing even date with the filing of this application; and consists in combining a vegetable substance in suitable proportions with an alkaline silicate and asbestus, for the purpose of producing a much lighter and cheaper coating than is afforded by the mixture and asbestus alone.

The following is a description of my improved coating and the method of compounding the same:

I take, say, one part of asbestus and reduce it by crushing, so that its fibers are loose, and mix with it, say one part of sawdust and other woody matter. I then add the silicate of soda or potash until the mass has a plastic consistency, which will admit of its being spread like cement upon a surface.

I have found by experiment that this compound will not emit a disagreeable oder when it becomes heated, and that the silicate used will prevent the woody matter from being destroyed by heat.

This compound is very light and porous, and will form a durable non-conducting coating for any object to which it may be applied.

Having described my invention, what I claim as new, and desire to secure by Letters Patent, is—

A plastic non-conducting coating, composed of the ingredients substantially as described.

WILLIAM A. FRENCH.

Witnesses:
EDWIN A. MORGAN,
JOHN L. LONGSTRETH.